US011905001B2

(12) United States Patent
Steadman et al.

(10) Patent No.: US 11,905,001 B2
(45) Date of Patent: Feb. 20, 2024

(54) WINGTIP TO WING AIRCRAFT CONNECTION ASSEMBLY

(71) Applicant: AIRBUS OPERATIONS LIMITED, Bristol (GB)

(72) Inventors: Clive Steadman, Bristol (GB); David Liversage, Bristol (GB); Ben Smith, Bristol (GB); Ruth Pullan, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/647,761

(22) Filed: Jan. 12, 2022

(65) Prior Publication Data

US 2022/0135212 A1 May 5, 2022

Related U.S. Application Data

(62) Division of application No. 16/161,371, filed on Oct. 16, 2018, now Pat. No. 11,260,964.

(30) Foreign Application Priority Data

Oct. 19, 2017 (GB) ..................................... 1717197

(51) Int. Cl.
*B64C 23/06* (2006.01)
*B64C 5/08* (2006.01)
*B64C 3/18* (2006.01)

(52) U.S. Cl.
CPC ............ *B64C 23/069* (2017.05); *B64C 3/187* (2013.01); *B64C 5/08* (2013.01)

(58) Field of Classification Search
CPC .......... B64C 23/069; B64C 3/187; B64C 5/08
See application file for complete search history.

(56) References Cited

U.S. PATENT DOCUMENTS

| 5,407,153 A | 4/1995 | Kirk et al. |
| 6,161,797 A * | 12/2000 | Kirk ....................... B64D 33/06 244/1 N |
| 11,260,964 B2 * | 3/2022 | Steadman ................. B64F 5/10 |
| 2007/0018049 A1 | 1/2007 | Stuhr |
| 2009/0283639 A1 | 11/2009 | Ackermann et al. |

(Continued)

FOREIGN PATENT DOCUMENTS

| EP | 3130534 | 2/2017 |
| WO | 2007018785 | 2/2007 |
| WO | 2014065718 | 5/2014 |

OTHER PUBLICATIONS

European Search Report for European Patent Application No. EP 18196230.9, 11 pages, dated Mar. 21, 2019.
Search Report for GB1717197.6, dated Apr. 18, 2018, 4 pages.

*Primary Examiner* — Jessica B Wong
(74) *Attorney, Agent, or Firm* — Nixon & Vanderhye P.C.

(57) ABSTRACT

An aircraft assembly is disclosed having a wing tip device connected to a wing tip of a wing by a first connector, a second connector, and a third connector. The wing tip device includes a front device spar and a rear device spar. The first connector is associated with the rear device spar. The second connector is spaced apart in a chordwise direction forward of the first connector, and the third connector is spaced apart in a chordwise direction rearward of the first connector. The third connector includes a spigot mounting formation.

14 Claims, 5 Drawing Sheets

(56) References Cited

U.S. PATENT DOCUMENTS

| | | | |
|---|---|---|---|
| 2012/0112005 A1 | 5/2012 | Chaussee et al. | |
| 2015/0013142 A1* | 1/2015 | West | B64D 27/26 29/525.08 |
| 2017/0137112 A1 | 5/2017 | Winkelmann et al. | |
| 2017/0341737 A1* | 11/2017 | Paisley | B64C 5/08 |
| 2018/0086458 A1* | 3/2018 | Sartorius | B64C 3/187 |

* cited by examiner

WINGTIP TO WING AIRCRAFT CONNECTION ASSEMBLY

CROSS REFERENCE TO RELATED APPLICATIONS

This application is a Divisional application of U.S. patent application Ser. No. 16/161,371, filed Oct. 16, 2018, now allowed, which claims priority to United Kingdom patent application GB 1717197.6, filed Oct. 19, 2017, the entire contents of each of which is hereby incorporated by reference.

FIELD OF THE INVENTION

The present invention relates to an aircraft assembly. In particular, the present invention relates to an aircraft assembly comprising a wing tip device connected to a wing tip of a wing. The present invention also relates to a wing tip device, and in particular a winglet, and a method of assembling a method of assembling a wing tip device with a wing tip of a wing.

BACKGROUND OF THE INVENTION

Wing tip devices are known to be disposed at the wing tips of aircraft wings. Devices such as winglets, raked wing tips and fences are collectively known as aerodynamic wing tip devices. Such devices are used to reduce the effects of lift induced drag.

Lift induced drag is caused by the generation of vortices at the wing tip. Such drag is mitigated by an increase in wing span. Increases in wing span in the plane of the wing are not always possible due to space requirements at, e.g. airports. As such out-of-plane extensions to the wing are commonly used to increase the effective wing span without increasing the geometric span of the aircraft. These take the form of aerodynamic wing tip devices.

A wing tip device is typically attached to the wing tip of a wing by means of connectors which connect the wing spars and the wing tip device spars. A series of splice plates or butt straps may be used which span the upper and lower skins of the wing tip device and the wing at the point at which they join.

The butt straps transfer load through the wing skin, which is primarily designed to absorb the bending load across the wing span, and less well suited to absorb local, concentrated, loads. Further, many joining locations on the wing skin are required to spread the applied load. Although this has the desired effect of reducing the load per joining location, it creates a statically indeterminate system making the loads at each point difficult to predict. Therefore each joint is typically over-engineered adding weight and cost to the aircraft.

A still further problem is that the interface between the parts is quite sensitive to differences in geometry caused by tolerance build-up at the interface. As such, any mis-match between the two components needs to be addressed upon assembly. This increases the cost of assembly and makes it more difficult to replace the wing tip devices in service. As such the ease of interchangeability of wing tip devices is reduced.

Further, temperature effects and loading in use can cause differential expansion or contraction of the wing tip device and the wing tip, which can cause high stresses at the mounting points.

SUMMARY OF THE INVENTION

According to an aspect of the invention, there is provided a wing tip device connected to a wing tip of a wing by a first connector, a second connector and a third connector, the wing tip device comprising a front device spar and a rear device spar, wherein the first connector is associated with the rear device spar, the second connector is spaced apart, in a chordwise direction, forward of the first connector, the third connector is spaced apart, in a chordwise direction, rearward of the first connector, and the third connector comprises a spigot mounting formation.

With this arrangement movement of the wing tip device aft of the rear device spar is constrained. Rigidity of the wing tip device towards and at the trailing edge is aided.

As such, relative flexing between the wing towards the trailing edge of the wing is restricted by a spigot mounting formation, and so rigidity in a thickness direction is aided.

The second connector may be associated with the front device spar.

With such an arrangement, the first and second connectors act through the main load bearing members of the wing tip device.

The wing tip may comprise a wing trailing edge, and the wing tip device may comprise a device trailing edge and the third connector may be configured to connect the device trailing edge with the wing trailing edge.

As such, this configuration helps to constrain movement of the trailing edge of the wing tip device relative to the wing tip. Flutter and relative deflection of the trailing edge of the wing tip device may be restricted by the rigid connection provided by the spigot mounting formation.

The wing tip device may comprise a closing rib located aft of the rear device spar, wherein the spigot mounting formation may be associated with the closing rib.

The spigot mounting formation may be on the closing rib. With such an arrangement, it is possible to limit the forces acting through the upper and lower covers of the skins of the wing.

The wing tip may comprise a forward wing spar and a rearward wing spar, wherein the first connector may associated with the rearward wing spar. The second connector may be associated with the forward wing spar. As such, the first and second connectors act through the main load bearing members of the wing tip device.

The wing tip may comprise a trailing edge end rib located aft of rearward wing spar and the spigot mounting formation may be associated with the trailing edge end rib. The spigot mounting formation may be on the trailing edge end rib.

The spigot mounting formation may comprise a spigot associated with the wing tip device or the wing tip, and a spigot retainer associated with the other of the wing tip device or the wing tip for receiving the spigot in a male/female connection.

The spigot may be on the wing tip device and the spigot retainer may be on the wing tip. This helps ease of assembly.

The spigot retainer may comprise a bush.

The bush may comprise a wear plate.

The spigot retainer may comprise an elongate retainer slot extending in the chordwise direction.

A height of the retainer slot may be configured to substantially conform with a diameter of the spigot in a direction perpendicular to the chordwise direction. With this arrangement, it is possible to move towards a statically determinate load path, and to allow for thermal expansion. In some embodiments, some adjacent components to the spigot mounting formation may be formed from a composite material and others from a metallic material. Such materials may have different rates of thermal expansion, and such variances may be accounted for. In embodiments, the wing tip device is predominantly formed of composite materials, and the wing tip is predominantly formed from metallic materials.

The spigot may be slidable in the slot between a first condition in which the trailing edge of the wing tip device is out of alignment with the wing tip trailing edge and a second condition in which the which the trailing edge of the wing tip device moves into alignment with the wing tip trailing edge. The trailing edge of the wing tip device may be movable in response to aerodynamic forces acting on the wing tip device during flight. When the aerodynamic forces absent from the wing tip device, the spigot may be slidable in the slot to reduce static forces acting on the wing tip device.

The first connector may comprise a first spigot mounting formation, and the second connector may comprise a second spigot mounting formation, wherein the spigot mounting formation as set out above may be a third spigot mounting formation.

As such, the use of such connector configurations, aids assembly and also provides for a rigid coupling between the wing tip and wing tip device. Furthermore, ease of interchangeability of the wing tip device is enhanced.

The first spigot mounting formation may comprise a first spigot associated with the wing tip device or the wing tip, and a first spigot retainer associated with the other of the wing tip device or the wing tip; the second spigot mounting formation may comprise a second spigot associated with the wing tip device or the wing tip, and a second spigot retainer associated with the other of the wing tip device or the wing tip; and wherein the spigot and spigot retainer as set out above may be a third spigot and a third spigot retainer.

Each connector may be configurable between an engaged condition in which the respective spigot is received by the respective spigot retainer in a male/female connection, and a disengaged condition in which the respective spigot is withdrawn from the respective spigot retainer.

When the wing tip device is brought into engagement with the wing tip, the first connector may be configured to move into its engaged condition prior to the second connector moving into its engaged condition.

When the wing tip device is brought into engagement with the wing tip, the second connector may be configured to move into its engaged condition prior to the third connector moving into its engaged condition.

This arrangement simplifies assembly of the wing tip device with the wing tip. As such, each connector is aligned and engaged individually. Furthermore, the arrangement ensures that the connectors on the main load bearing members are engaged first.

The third spigot may upstand from a plane extending in a chordwise direction, and wherein the length of the third spigot from the plane to a third spigot free end may be less than the length of the first spigot from the plane to a first spigot free end.

The length of the second spigot from the plane to a second spigot free end may be greater than the length of the third spigot from the plane to the third spigot free end.

The first spigot retainer may comprise a first retainer hole and wherein the dimensions of the first retainer hole may be configured to substantially conform with a diameter of the spigot in both directions parallel to and perpendicular to the chordwise direction.

By ensuring close tolerance fit between the first spigot retainer and the first spigot it is possible to accurately locate the wing tip device, and to align the other spigots.

The second spigot retainer may comprise an elongate second retainer slot extending in a chordwise direction, and wherein the height of the second retainer slot may be configured to conform with a diameter of the spigot in a direction perpendicular to the chordwise direction.

As such, it is possible to account for thermal expansion and provides a move towards a statically determinant load path at the second connector. Therefore, a weight reduction may be achieved.

When assembled, the wing tip and the wing tip device may together define a spanwise axis, wherein an elongate axis of each of the spigots is at an offset angle to the spanwise axis at the juncture of the wing tip and the wing tip device and, optionally, wherein the offset angle is 2 to 6 degrees and, optionally, wherein the offset angle is 4 degrees.

The elongate axis of each of the spigots may extend upwardly from the wing tip device.

As such the approach angle upon assembly is configured to provide an ease of assembly engagement, and restrict the potential for clash.

The wing tip may comprise a wing skin, and the wing tip device may comprise a wing tip device skin, and the aircraft assembly may comprise a butt-strap between the wing skin and the wing tip device skin.

The wing skin may be a metallic material, and the wing tip device skin may be a composite material.

Prior to assembly of the wing tip and the wing tip device, the butt strap may be a first butt-strap formed from a metallic material on the wing tip device skin, and the wing tip device may be a second butt-strap formed from a composite material on the wing skin. This arrangement aids assembly by providing components of the same material with each other for fixing when the wing tip and wing tip assembly are brought together.

The or each butt-strap may be disposed only at or forward of the first connector. As such, the assembly time of the wing tip device with the wing tip is reduced. Loading is carried through the spigot mounting formation and so loading on the wing skin and wing tip device skin is reduced.

The wing tip device may be a winglet.

According to an aspect of the invention, there is provided a wing tip device configured to connect to a wing tip of an aircraft wing, the wing tip device comprising a front device spar, a rear device spar, a first load-bearing wing tip connecting spigot associated with the rear device spar, a second load-bearing wing tip connecting spigot spaced apart in a chordwise direction forward of the first spigot, and a third wing tip connecting spigot spaced apart in a chordwise direction rearward of the first spigot.

The second spigot may be associated with the front device spar.

The wing tip device may comprise a wing tip device trailing edge, wherein the third spigot may be associated with the wing tip device trailing edge.

According to an aspect of the invention, there is provided a method of assembling a wing tip device and a wing tip of a wing, the method comprising locating the wing tip device relative to the wing tip, engaging a first spigot associated with the rear device spar and one of the wing tip device or the wing tip with a first spigot retainer associated with the other of the wing tip device or the wing tip, subsequently, engaging a second spigot spaced apart, in a chordwise direction, forward of the first spigot and associated with one of the wing tip device or the wing tip with a second spigot retainer associated with the other of the wing tip device or the wing tip, and subsequently, engaging a third spigot spaced apart, in a chordwise direction, rearward of the first spigot and associated with one of the wing tip device or the wing tip with a third spigot retainer associated with the other of the wing tip device or the wing tip.

According to an aspect of the invention, there is provided a wing tip device configured to connect to a wing tip of an aircraft wing, the wing tip device comprising a first load-bearing wing tip connecting spigot, a second load-bearing wing tip connecting spigot spaced apart in a chordwise direction forward of the first spigot, and a third wing tip connecting spigot spaced apart in a chordwise direction rearward of the first spigot.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
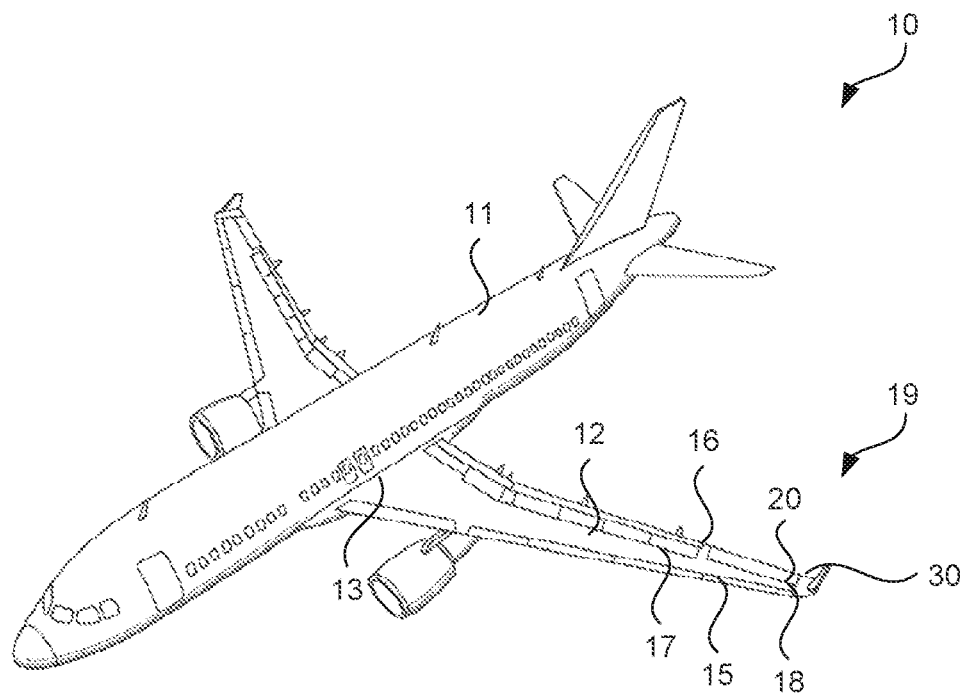
FIG. 1 is a perspective view of an aircraft.

An aircraft 10 is shown in FIG. 1. The aircraft 10 includes a fuselage 11. Two wings 12 extend from the fuselage 11. It will be appreciated that the fuselage 11 and wings 12 may take a variety of different planned formed shapes and profiles depending on the particular application. Each wing 12 has a wing root 13 at the juncture with the fuselage 11. The wing 12 has a wing tip 20 at a distal end to the wing root 13. The wing 12 has a leading edge 15 and a trailing edge 16. The wing 12 comprises a wing box 17. The wing box forms the main body of the wing 12.

In the following description, the term "front" refers to components towards the leading edge of the wing, and the term "rear" refers to components towards the trailing edge of the wing. The terms "forward" and "rearward" shall be construed accordingly. The position of features may be construed relative to other components, for example a forward component may be disposed on a forward side of another component, but towards the rear of the wing. The trailing edge relates to a rearmost section aft of the rear spar.

Figure 2:
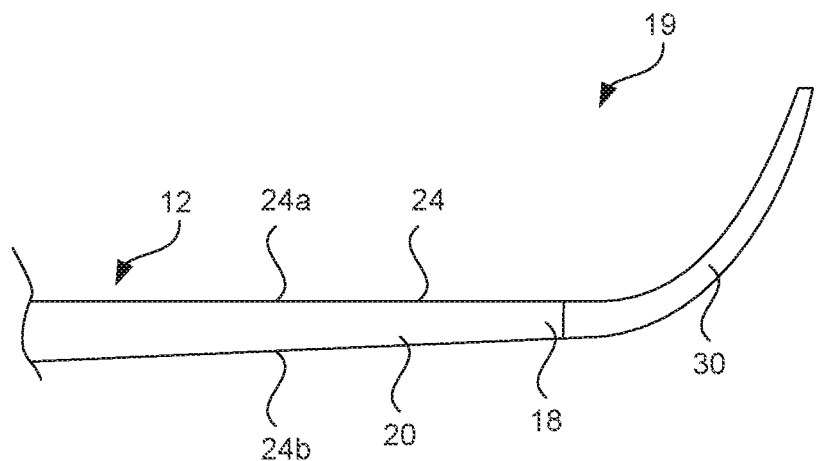
FIG. 2 is a schematic view of a leading edge of a wing tip with a wing tip device.

One of the wings 12 will be described herein. Referring to FIG. 2, the wing tip 20 is formed by the end of the wing 12. A wing tip device 30 is at the wing tip 20. In this example the wing tip device 30 is a winglet. The wing tip 20 terminates at an outboard end 18. The wing tip device 30 extends from the wing tip 20. The wing tip device 30 extends from the outboard end 18.

The wing 12 has a spanwise axis which extends in a direction from the wing root 13 to the wing tip 20. The wing tip device 30 extends in a spanwise direction from the wing tip 20. The wing 12 has a chordwise axis which extends in a direction from the leading edge 15 to the trailing edge 16. The wing 12 and wing tip device 30 each experience an aerodynamic lift force which acts through the centre of pressure.

Figure 3:
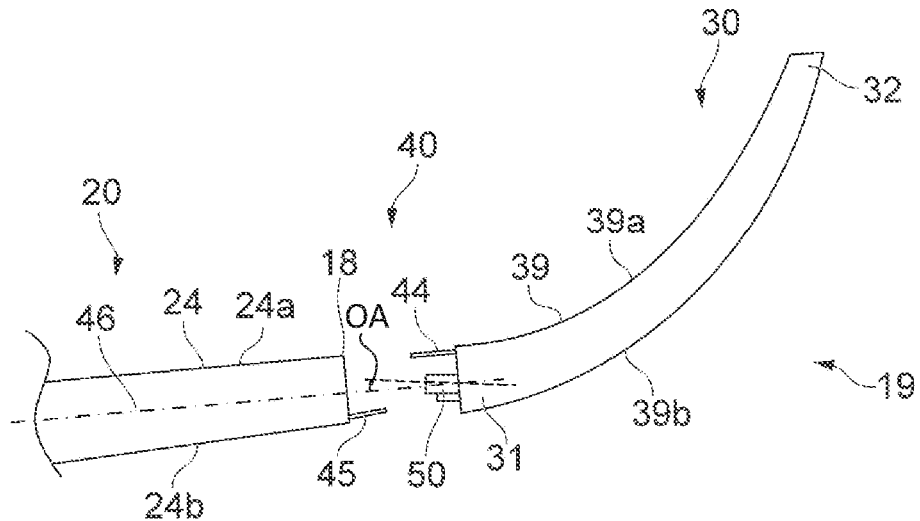
FIG. 3 is a schematic view of the wing tip and wing tip device shown in FIG. 2 with the wing tip device disengaged from the wing tip.

The wing tip device 30 is attached to the wing tip 20 at the outboard end 18. The wing tip 30 is shown in FIGS. 3 and 7. A mounting arrangement 40 (as shown in FIGS. 1 to 8B) mounts the wing tip device 30 to the wing tip 20. Aerodynamic forces act on the wing tip device 30, and so the wing tip device 30 is stably attached to the outboard end 18 by the mounting arrangement 40. A torque may act on the wing tip device 30 to urge rotation of the wing tip device 30 about an axis extending in a spanwise direction. A torque may act on the wing tip device 30 to urge rotation of the wing tip device 30 about an axis extending in a chordwise direction.

Figure 4:
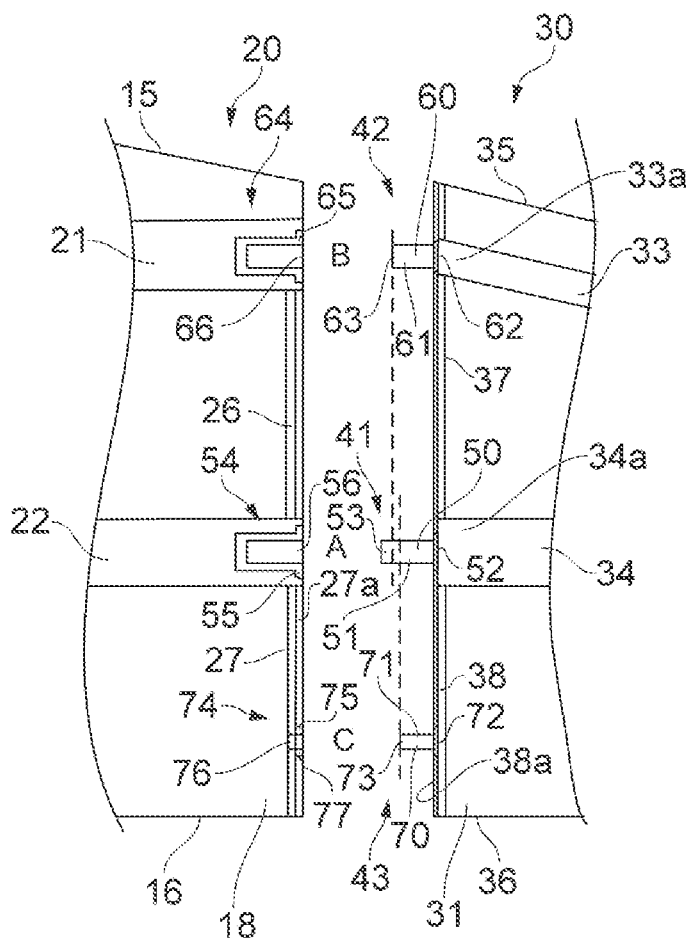
FIG. 4 is a schematic partial cut-away plan view of the wing tip and part of wing tip device shown in FIG. 3.
Figure 5:
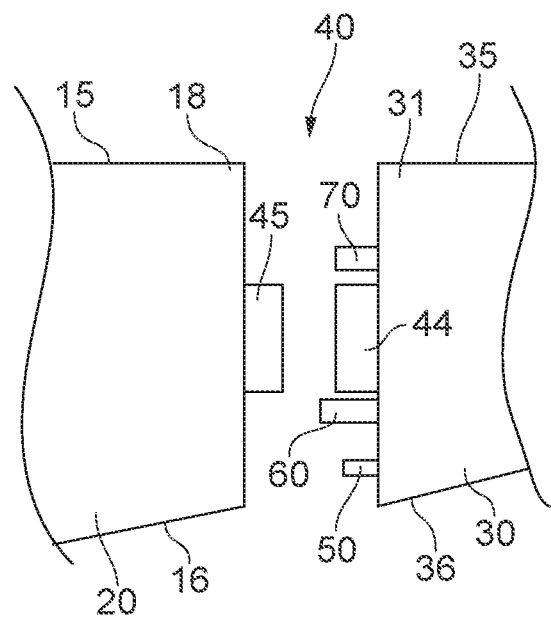
FIG. 5 is a schematic plan view of the wing tip and part of wing tip device shown in FIG. 3.

In FIGS. 2 to 4, a wing assembly 19 is shown in schematic form comprising the wing tip 20 and the wing tip device 30.

The wing tip 20 comprises a forward wing spar 21 and a rearward wing spar 22. Each of the forward and rearward spars 21, 22 run in a generally spanwise direction. The forward and rearward wing spars 21, 22 converge along the span of the wing towards the wing tip 20. A series of ribs are positioned along the wing span and extend in the direction of the wing chord. The wing tip 20 is covered by a wing skin 24 comprising a wing upper cover 24a and a wing lower cover 24b. The spars and ribs are covered by the wing skin primarily designed to present an aerodynamic surface to the airflow. The wing tip 20 terminates at the outboard end 18.

The wing tip 20 has an end rib 26. The end rib 26 extends between the forward and rearward wing spars 21, 22. The end rib 26 is at the outboard end 18. The end rib 26 is exposed when the wing tip device 30 is removed from the wing tip 20.

The wing tip 20 has a trailing edge end rib 27. The trailing edge end rib 27 is disposed rearward of the rearward wing spar 22. The trailing edge end rib 27 extends from the rearward wing spar 22. The trailing edge end rib 27 is at the outboard end 18. The trailing edge end rib 27 is exposed when the wing tip device 30 is removed from the wing tip 20.

The wing tip device 30, in this embodiment the winglet, comprises a wing tip device root 31 and a free end 32 distanced from and vertically spaced from the wing tip device root 31.

The wing tip device 30 comprises a front device spar 33 and a rear device spar 34. The front device spar 33 extends from a position partway between the free end 32 and the device root 31 and extends to the device root 31. The front device spar 33 is disposed towards a device leading edge 35. The rear device spar 34 runs from the position midway along the wing tip device 30 towards the device root 31. The rear device spar 34 diverges from the front device spar 33 towards the device root 31. The rear device spar 34 is disposed substantially midway along the device root 31 at the device root 31 in the chordwise direction. The rear device spar 34 is disposed rearwardly of the front device spar 33 towards a device trailing edge 36.

A wing tip device skin 39 covers the wing tip device 30 in order to present an aerodynamic surface to the airflow. The wing tip device skin 39 has an upper device cover 39a and a lower device cover 39b.

The wing tip device 30 has a root rib 37. The root rib 37 extends between the front and rear device spars 33, 34. The root rib 37 is at the device root 31. The root rib 37 is exposed when the wing tip device 30 is removed from the wing tip 20.

The wing tip device 30 has a closing rib 38. The closing rib 38 is disposed rearward of the rear device spar 34. The closing rib 38 extends from the rear device spar 34. The closing rib 38 is at the device root 31. The closing rib 38 is exposed when the wing tip device 30 is removed from the wing tip 20.

The mounting arrangement 40 comprises a first connector 41, a second connector 42 and a third connector 43. The mounting arrangement 40 comprises a first, upper, butt-strap 44 and a second, lower, butt-strap 45. As shown in FIG. 3, the wing tip and the wing tip device together define a spanwise axis 46.

Figure 6:
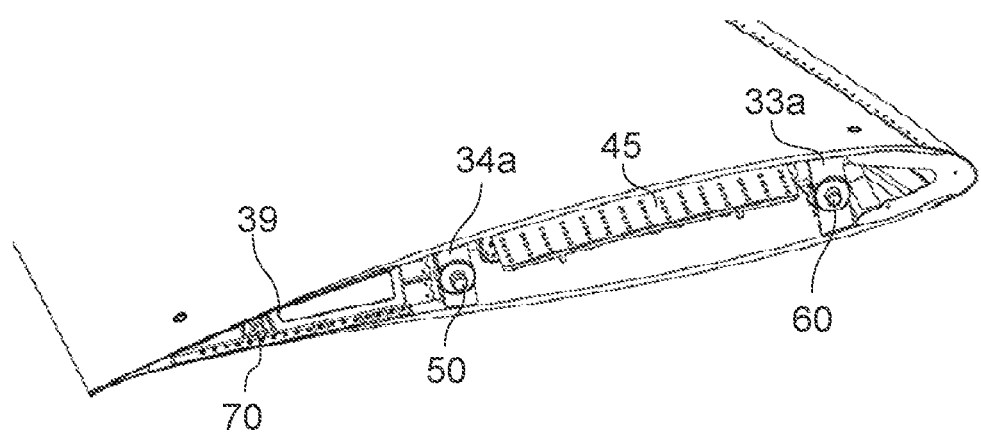
FIG. 6 is a perspective view of part of the wing tip device shown in FIG. 2, with spigots for mounting with the wing tip shown.
Figure 7:
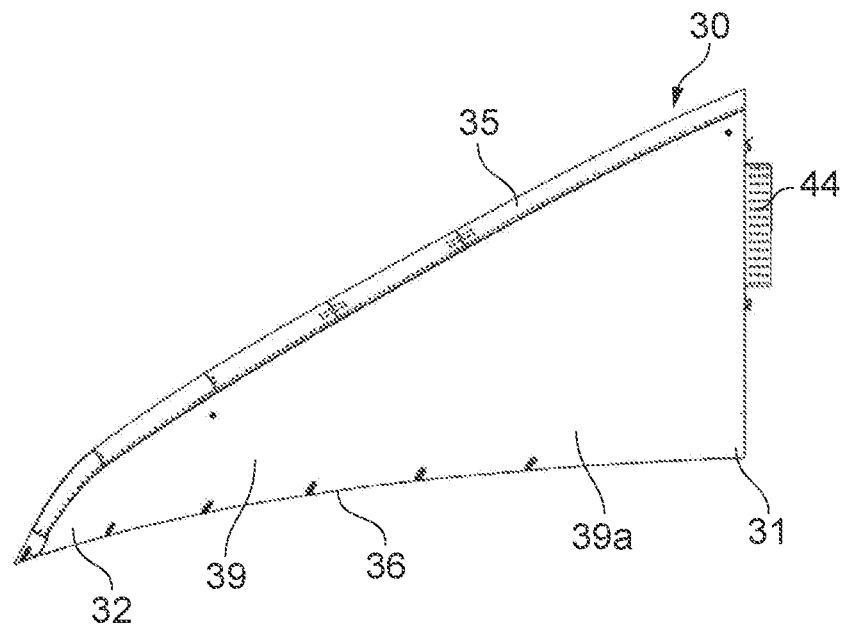
FIG. 7 is a plan view of the wing tip device shown in FIG. 2.

Turning to FIGS. 3, 4 and 6, it will be apparent that the wing tip device 30 attaches to the wing tip 20 at three primary attachment points A, B and C.

The front device spar 33 attaches to the forward wing spar 21 via first connector 41 at attachment point A. The rear device spar 34 attaches to the rearward wing spar 22 via second connector 42 at attachment point B. The wing tip device trailing edge 36 attaches to the wing trailing edge 16 via third connector 43 at attachment point C. The first, second and third connectors 41, 42, 43 are at the device root 31.

The first connector 41 comprises as a spigot mounting formation including a first spigot 50. The first spigot 50 protrudes from the device root 31. The first spigot 50 includes an elongate pin 51. The first spigot 50 is on the rear device spar 34. A first spigot fitting 52 mounts the first spigot 50 to a root end 34a of the rear device spar 34. The first spigot fitting 52 is associated with the rear device spar 34. Loading through the rear device spar 34 is able to act through the first spigot 50. The first spigot 50 extends in a spanwise direction from the root end 34a. The first spigot 50 has a first spigot free end 53. The first spigot free end 53 is at a distal end of the first spigot 50 to the first spigot fitting 52. The first spigot 50 defines a first elongate axis from the first spigot fitting 52 to the first spigot free end 53.

The first connector 41 comprises a first spigot retainer 54. The first spigot retainer 54 is configured to receive the first spigot 50. The first spigot retainer 54 is on the wing tip 20. The first spigot retainer 54 is at the outboard end 18. The first spigot retainer 54 is on the rearward wing spar 22. The first spigot retainer 54 is associated with the rearward wing spar 22. Loading through the rearward wing spar 22 is able to act through the first spigot retainer 54.

Figure 8A:
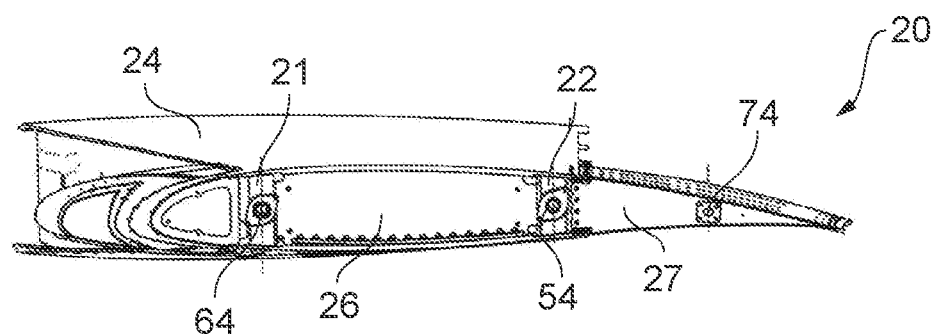
FIG. 8A is a perspective view of an outboard end of the wing tip shown in FIG. 2 showing spigot retainers for receiving the spigots of the wing tip device shown.
Figure 8B:
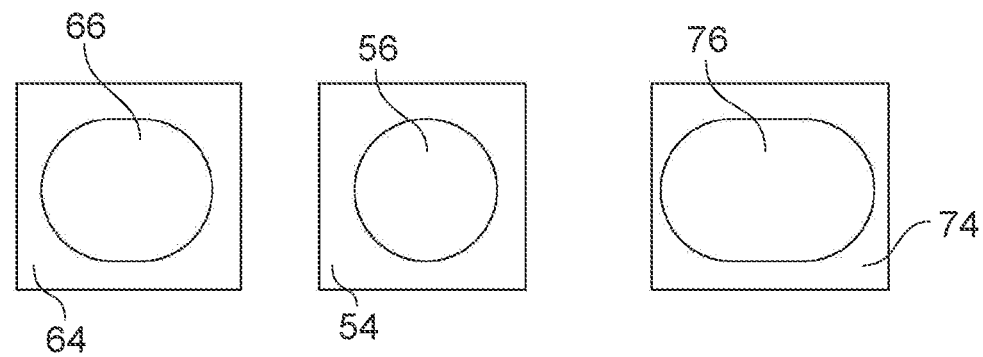
FIG. 8B is a schematic view of the spigot retainers shown in FIG. 8A.

The first spigot retainer 54 comprises a bush 55. The bush 55 is formed from bronze, although other suitable materials may be used. The bush 55 comprises a first retainer hole 56, as shown in FIGS. 8A and 8B. The bush 55 defines a loading surface. The first retainer hole 56 has dimensions which are configured to substantially conform with a diameter of the first spigot 50 in both directions parallel to and perpendicular to the chordwise direction. The first retainer hole 56 has a diameter to form a tight fit with the first spigot 50. As such, the first connector 41 acts as a locking pin spigot in which the first connector 50 is able to react to side forces, and so all degrees of freedom are constrained. In particular, there is no ability to move in a spanwise or chordwise direction.

The second connector 42 comprises as a spigot mounting formation including a second spigot 60. The second spigot 60 protrudes from the device root 31. The second spigot 60 includes an elongate pin 61. The second spigot 60 is on the front device spar 33. A second spigot fitting 62 mounts the second spigot 60 to a root end 33a of the front device spar 34. The second spigot fitting 62 is associated with the front device spar 33a. Loading through the front device spar 33a is able to act through the second spigot 60. The second spigot 60 extends in a spanwise direction from the root end 33a. The second spigot 60 has a second spigot free end 63. The second spigot free end 63 is at a distal end of the second spigot 60 to the second spigot fitting 62. The second spigot 60 defines a second elongate axis from the second spigot fitting 62 to the second spigot free end 63.

The second connector 42 comprises a second spigot retainer 64. The second spigot retainer 64 is configured to receive the second spigot 60. The second spigot retainer 64 is on the wing tip 20. The second spigot retainer 64 is at the outboard end 18. The second spigot retainer 64 is on the forward wing spar 21. The second spigot retainer 64 is associated with the forward wing spar 21. Loading through the forward wing spar 21 is able to act through the second spigot retainer 64.

The second spigot retainer 64 comprises a bush 65. The bush 65 is formed from bronze, although other suitable materials may be used. The bush 65 comprises a second retainer slot 66, as shown in FIGS. 8A and 8B. The bush 65 defines a loading surface. The second retainer slot 66 is elongate and extends in a chordwise direction. The height of the second retainer slot 66 is configured to substantially conform with the diameter of the second spigot 60 in a direction perpendicular to the chordwise direction. The length of the second retainer slot 66 is greater than the diameter of the second spigot 60. As such, the second connector is unable to react a side force in the chordwise direction within certain limits.

The release of certain degrees of freedom (e.g. the inability of the second spigot 60 to react the side force) allows the system some relative movement to avoid thermally induced stresses whilst making the loads more predictable (moving towards a statically determinate system). For example, because the joint at second connector 42 does not need to react the side force, it can be made smaller as a result (i.e. can be optimised for a more predictable load case).

The third connector 43 comprises a third spigot 70. The third spigot 70 protrudes from the device root 31. The third spigot 70 includes an elongate pin 71. The third spigot 70 is on the closing rib 38. A third spigot fitting 72 mounts the third spigot 70 to an inboard face 38a of the closing rib 38. The third spigot fitting 72 is associated with the closing rib 38. Loading on the device trailing edge 36 is able to act through the third spigot 70. Such loading may result from aerodynamic forces acting on the wing tip device 30. The third spigot 70 extends in a spanwise direction from the root end 33a. The third spigot 70 has a third spigot free end 73. The third spigot free end 73 is at a distal end of the third spigot 70 to the third spigot fitting 72. The third spigot 70 defines a third elongate axis from the third spigot fitting 72 to the third spigot free end 73.

The third connector 43 comprises as a spigot mounting formation including a third spigot retainer 74. The third spigot retainer 74 is configured to receive the third spigot 70. The third spigot retainer 74 is on the wing tip 20. The third spigot retainer 74 is at the outboard end 18. The third spigot retainer 74 is on the trailing edge end rib 27. The third spigot retainer 74 is associated with the trailing edge end rib 27. Loading through the trailing edge end rib 27 is able to act through the second spigot retainer 64. The third spigot retainer 74 mounts to an outboard face 27a of the trailing edge end rib 27. Loading on the wing trailing edge 16 is able to act through the third spigot retainer 74. Such loading may result from aerodynamic forces acting on the wing trailing edge 16.

The third spigot retainer 74 comprises a bush 75. The bush 75 is formed from bronze, although other suitable materials may be used. The bush 75 comprises a third retainer slot 76, as shown in FIGS. 8A and 8B. The bush 75 is formed by a wear plate 77. An aperture is formed through the trailing edge end rib which aligns to the mounting of the third spigot retainer 74 to provide for the third spigot 70 to extend therethrough. The bush 75 defines a loading surface. The third spigot retainer slot 76 is elongate and extends in a chordwise direction. The height of the third retainer slot 76 is configured to substantially conform with the diameter of the third spigot 70 in a direction perpendicular to the chordwise direction. The length of the third retainer slot 76 is greater than the diameter of the third spigot 70. As such, the third connector 43 is unable to react a side force in the chordwise direction within certain limits.

The release of certain degrees of freedom (e.g. the inability of the third spigot 70 to react the side force) allows the system some relative movement to avoid thermally induced stresses whilst making the loads more predictable (moving towards a statically determinate system). For example, because the joint at third connector 43 does not need to react the side force, it can be made smaller as a result (i.e. can be optimised for a more predictable load case).

The loading acting through the third spigot 70 is configured to be lower than that acting through the first and second spigots 50, 60. The third connector 43 is configured to react loading through the wing trailing edge 16 and the device trailing edge 36. As such, the third connector 43 reacts forces acting on the wing tip 20 and wing tip device 30 aft of the rearward wing spar 22 and rear device spar 34. The third connector 43 acts to ensure that the wing skin 24 and wing tip device skin 39 are maintained in alignment. The wing trailing edge 16 and the device trailing edge 36 are not load bearing and conventionally may flutter during flight. The provision of the third connector 43 ensures that the device trailing edge 36 and the wing trailing edge 16 move together, minimising the creation of gaps between the surfaces of the wing tip device 30 and the wing tip 20 during flight. As such aerodynamic efficiency at the juncture of the wing tip 20 and wing tip device 30 is maximised. The third connector 43 acts through ribs at the wing tip and wing tip device and so forces acting through the skins are minimised.

The upper and lower butt-straps 44, 45 of the mounting arrangement 40 extend between the wing tip 20 and wing tip device 30 when assembled. The upper butt strap 44 extends between the upper cover 24a of the wing skin 24 and the upper cover 39a of the device skin 39. The upper butt strap 44 is fixedly mounted between the upper cover 24a of the wing skin 24 and the upper cover 39a of the device skin 39 and acts as a splice plate. The lower butt strap 45 extends between the lower cover 24b of the wing skin 24 and the lower cover 39b of the device skin 39. The lower butt strap 45 is fixedly mounted between the lower cover 24b of the wing skin 24 and the lower cover 39b of the device skin 39 and acts as a splice plate.

In the present embodiment, the wing skin 24 is a metallic skin and the wing tip device skin 39 is a composite skin. The upper butt strap 44 is a metallic butt-strap and is mounted to the composite wing tip device skin 39 prior to assembly of the wing tip 20 and wing tip device 30. The lower butt-strap 45 is a composite butt-strap and is mounted to the metallic wing skin 24 prior to assembly of the wing tip 20 and wing tip device 30. When the wing tip 20 and wing tip device 30 are brought together, this arrangement assists alignment of the butt-straps 44, 45 and aids fixing.

Each spigot 50, 51, 52 is at an angular offset from the spanwise axis 46 defined by the wing tip 20 and the wing tip device 30. The elongate axis of each spigot 50, 51, 52 is at an offset angle OA to the spanwise axis at the juncture of the outboard end 18 of the wing tip 20 and the device root 31 of the wing tip device 30. Each spigot 50, 51, 52 extends upwardly from the device root 31. That is, each spigot is inclined towards the plane of the upper cover 24a of the wing 12 away from the device root 31, when assembled. The offset angle OA is in the range of 2 to 6 degrees. In the present embodiment, the offset angle is 4 degrees. This arrangement allows the wing tip device 30 to be presented to the wing tip 20 from below during assembly.

Each connector 41, 42, 43 is configurable between an engaged condition, when the wing tip 20 and wing tip device 30 are in an assembled condition, in which the respective spigot is received by the respective spigot retainer in a male/female connection, and a disengaged condition, when the wing tip 20 and wing tip device 30 are in an assembled condition, and in which the respective spigot is withdrawn from the respective spigot retainer.

The first, second and third spigots 50, 60, 70 extend from the wing tip device 30 by differing extents. The third spigot 70 upstands from a plane extending in a chordwise direction of the wing tip device 30. The length of the third spigot 70 from the plane to the third spigot free end 73 is less than the length of the first spigot 70 from the plane to the first spigot free end 53. The length of the second spigot 60 from the plane to the second spigot free end 63 is greater than the length of the third spigot 70 from the plane to the third spigot free end 73. The first spigot 50 protrudes further outwardly than the second spigot 60. The second spigot 60 protrudes further outwardly than the third spigot 70.

It will be noted that because the present invention only uses three attachment points, and by providing the first and third spigots in chordwise extending spigot receiving slots, it is possible to constrain the wing tip device in a manner which makes the system statically determinate. Therefore, each attachment point can be designed around a known load case. This offers an advantage over the prior art in which generally a high number of fixings are used for load-bearing purposes and consequently a statically indeterminate system is formed in which the exact load case on each attachment point is unknown. Therefore each attachment point has to be over-engineered to cope with the worst possible case.

Figure 9A:
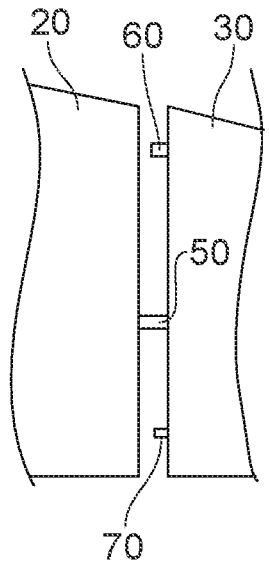
FIG. 9A is a schematic plan view of the wing tip and part of wing tip device shown in FIG. 3 in a first partially assembled condition with a first spigot received by a first spigot retainer.
Figure 9B:
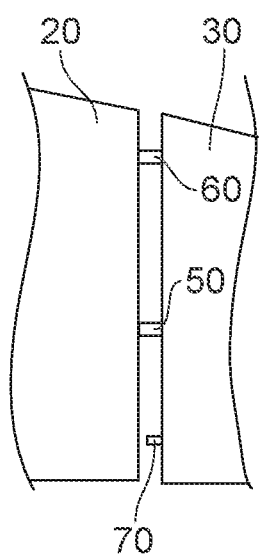
FIG. 9B is a schematic plan view of the wing tip and part of wing tip device shown in FIG. 9A in a second partially assembled condition with first and second spigots received by first and second spigot retainers.
Figure 9C:
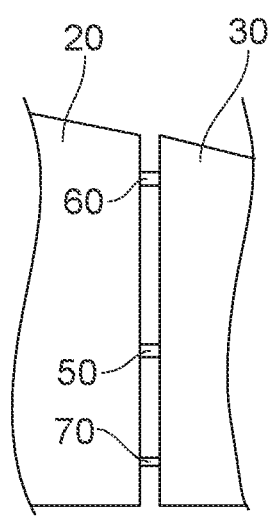
FIG. 9C is a schematic plan view of the wing tip and part of wing tip device shown in FIG. 9A in a third partially assembled condition with first, second and third spigots received by first, second and third spigot retainers.

Referring to FIGS. 9A to 9C, a method of attachment of a wing tip device is shown. The wing assembly 19 is shown comprising the wing tip 20 and a wing tip device 30. The wing tip device 30 is attached to the wing tip 20 at attachment points B, A, C in a chordwise direction from leading edge to trailing edge. In the wing assembly 19, the attachment points B, A and C have their horizontal chordwise axes (parallel to axis Y) of rotation aligned as will be described below. The wing tip device 30 is moved proximate the wing tip 20 on a trolley jack or similar. The jack is elevated to move the wing tip device 30 such that the first, second and third spigots 50, 60, 70 are aligned with their respective receiving points on the wing tip 20. The wing tip device 30 may be presented from slightly below the wing tip 20 due to the offset angular arrangement of the spigots 50, 60, 70. The joints can then be assembled.

When the wing tip device 30 is brought into engagement with the wing tip 20, the first connector 41 is configured to initially move into its engaged condition prior to the second and third connectors 42, 43 moving into their engaged condition, as shown in FIG. 9A. As a result, it is relatively straightforward to align a single attachment point. When the free end 53 of the first spigot 50 is received by the first spigot retainer 54 sideways movement is restricted due to the close fit of the two components. As such, the wing tip device 20 is easily moved by rotation to align the second spigot 60 with the second spigot retainer 63. The wing tip device is then further moved in an axial direction so that the first and second spigots 50, 60 are engaged with their respective spigot retainers, as shown in FIG. 9B. As such the load bearing requirements may be carried by the first and second connectors 41, 42 without a load being carried by the third connector 70 during assembly. Rotation of the wing tip device 30 about the wing tip 20 is prevented by the first and second connectors 41, 42. The wing tip device is then further moved in an axial direction so that the third spigot 70 is engaged with its respective spigot retainer 74, as shown in FIG. 9C. The wing tip device 30 is then fully assembled with the wing tip 20. The butt-straps 44, 45 are fixed between the skins 24, 39. The jack can then be removed.

The above described arrangement simplifies assembly of the wing tip device with the wing tip. As such, each connector is aligned and engaged sequentially.

When the wing tip device 30 is brought into engagement with the wing tip, the first connector may be configured to move into its engaged condition prior to the second connector moving into its engaged condition.

When the wing tip device is brought into engagement with the wing tip, the second connector may be configured to move into its engaged condition prior to the third connector moving into its engaged condition.

This arrangement simplifies assembly of the wing tip device with the wing tip. As such, each connector is aligned and engaged sequentially. Furthermore, the arrangement ensures that the connectors on the main load bearing members are engaged first.

Although in the above described embodiments, the spigots are disposed on the wing tip device, and the spigot retainers are on the wing tip, it will be understood that the arrangement of one or more of the connectors may be reversed. For example, one or more spigots may be on the wing tip. An advantage of the spigots being on the wing tip is that the ability of the aircraft to fly without one or more wing tip assemblies assembled on the aircraft is enhanced. Furthermore, ease of alignment of the spigot and spigot retainers, and therefore a reduction in assembly time, is enhanced by locating the spigots on the wing tip device.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly, comprising:
a wing tip device connected to a wing tip by a first connector, a second connector and a third connector, the wing tip device comprising a front device spar and a rear device spar, wherein:
the first connector is associated with the rear device spar,
the second connector is spaced apart, in a chordwise direction, forward of the first connector,
the third connector is spaced apart, in a chordwise direction, rearward of the first connector,
wherein the first connector comprises a first spigot mounting formation comprising a first spigot associated with one of the wing tip device or wing tip, and a first spigot retainer associated with the other of the wing tip device or wing tip;
wherein the first spigot retainer comprises a first retainer hole, and wherein dimensions of the first retainer hole are configured to substantially conform with a diameter of the first spigot in directions both parallel to and perpendicular to the chordwise direction;
wherein the second connector comprises a second spigot mounting formation,
wherein the second spigot mounting formation comprises a second spigot associated with one of the wing tip device or the wing tip, and a second spigot retainer associated with the other of the wing tip device or the wing tip,
wherein the second spigot retainer comprises an elongate second retainer slot extending in a chordwise direction, and wherein a height of the second retainer slot is configured to conform with a diameter of the second spigot in a direction perpendicular to the chordwise direction, and wherein the second retainer slot has a length extending in the chordwise direction, and the length of the second retainer slot is greater than a diameter of the second spigot such that the second spigot is able to translate in the chordwise direction within limits of the length of the second retainer slot;
wherein the third connector comprises a third spigot mounting formation,
wherein the third spigot mounting formation comprises a third spigot associated with one of the wing tip device or the wing tip, and a third spigot retainer associated with the other of the wing tip device or the wing tip for receiving the third spigot, and the third spigot retainer comprises an elongate third retainer slot extending in the chordwise direction and a height of the third retainer slot is configured to substantially conform with a diameter of the third spigot in a direction perpendicular to the chordwise direction, and wherein the third retainer slot has a length extending in the chordwise direction, and the length of the third retainer slot is greater than a diameter of the third spigot such that the third spigot is able to translate in the chordwise direction within limits of the length of the third retainer slot, and
wherein the wing tip comprises a wing skin, and the wing tip device comprises a wing tip device skin, and the aircraft assembly comprises a butt-strap between the wing skin and the wing tip device skin.

2. The aircraft assembly of claim 1, wherein the second connector is associated with the front device spar.

3. The aircraft assembly of claim 1, wherein the wing tip comprises a wing trailing edge, and the wing tip device comprises a device trailing edge and the third connector is configured to connect the device trailing edge with the wing trailing edge.

4. The aircraft assembly of claim 1, wherein the wing tip device comprises a closing rib located at least aft of the rear device spar, wherein the spigot mounting formation is associated with the closing rib.

5. The aircraft assembly of claim 1, wherein the wing tip comprises a forward wing spar and a rearward wing spar, wherein the first connector is associated with the rearward wing spar.

6. The aircraft assembly of claim 5, wherein the wing tip comprises a trailing edge end rib located at least aft of rearward wing spar, wherein the third spigot mounting formation is associated with the trailing edge end rib.

7. The aircraft assembly of claim 1, wherein the first spigot retainer or the second spigot retainer or the third spigot retainer are for receiving the respective first spigot or second spigot or third spigot in a male/female connection.

8. The aircraft assembly of claim 1, wherein the first connector is configured to move into an engaged condition prior to the second connector moving into an engaged condition when the wing tip device engages the wing tip.

9. The aircraft assembly of claim 1, wherein the second connector is configured to move into an engaged condition prior to the third connector moving into an engaged condition when the wing tip device engages the wing tip.

10. The aircraft assembly of claim 1, wherein the butt-strap is disposed only at or forward of the first connector.

11. The aircraft assembly according to claim 1, wherein the wing tip device comprises an upper device cover and a lower device cover, and
the wing tip comprises a wing upper cover and a wing lower cover, wherein the upper device cover is fixed to the wing upper cover by an upper butt-strap or an upper splice plate fixedly mounted between the upper device cover and the wing upper cover, and the lower device cover is fixed to the wing lower cover.

12. The aircraft assembly of claim 1, wherein the third connector spigot mounting formation constrains movement of the wing tip device aft of the rear device spar, such that relative flexing between the wing towards the trailing edge of the wing is restricted.

13. The aircraft assembly of claim 1, wherein the third connector spigot mounting formation aids rigidity of the wing tip device in a thickness direction.

14. The aircraft assembly of claim 11, wherein the lower device cover is fixed to the wing lower cover by a lower butt-strap or a lower splice plate fixedly mounted between the lower device cover and the wing lower cover.

* * * * *